United States Patent

Wang

[11] Patent Number: 5,936,612
[45] Date of Patent: Aug. 10, 1999

[54] COMPUTER INPUT DEVICE AND METHOD FOR 3-D DIRECT MANIPULATION OF GRAPHIC OBJECTS

[76] Inventor: Yanqing Wang, 542 Louis Riel House, Burnaby, British Columba, Canada, V5A 1S6

[21] Appl. No.: 08/865,702

[22] Filed: May 30, 1997

[51] Int. Cl.6 ................................................. G09G 5/08
[52] U.S. Cl. .......................... 345/164; 345/163; 345/126
[58] Field of Search .................................... 345/163, 164, 345/165, 166, 167, 156, 157, 126

[56] References Cited

U.S. PATENT DOCUMENTS

| | | | |
|---|---|---|---|
| 4,628,755 | 12/1986 | Hawley . | |
| 5,063,289 | 11/1991 | Jasinski | 345/167 |
| 5,162,781 | 11/1992 | Cambridge | 345/163 |
| 5,280,276 | 1/1994 | Kwok | 345/167 |
| 5,298,919 | 3/1994 | Chang . | |
| 5,313,229 | 5/1994 | Gilligan et al. . | |
| 5,404,152 | 4/1995 | Nagai | 345/166 |
| 5,473,344 | 12/1995 | Bacon | 345/163 |
| 5,512,920 | 4/1996 | Gibson | 345/167 |
| 5,521,617 | 5/1996 | Imai | 345/167 |
| 5,530,455 | 6/1996 | Gillick et al. . | |
| 5,561,445 | 10/1996 | Miwa | 345/167 |
| 5,583,541 | 12/1996 | Solhjell | 345/167 |
| 5,619,231 | 4/1997 | Shouen | 345/163 |
| 5,703,620 | 12/1997 | Keyson | 345/145 |
| 5,714,977 | 2/1998 | Mc Neil | 345/157 |

OTHER PUBLICATIONS

H. Nomura and A. Saitoh, Mouse, IBM Technical Disclosure Bulletin, vol. 27, No. 6, Nov., 1984.

*Primary Examiner*—Steven J. Saras
*Assistant Examiner*—Alecia D. Nelson
*Attorney, Agent, or Firm*—Oyen Wiggs Green & Mutala

[57] ABSTRACT

A computer input device has a housing and position sensors in the housing which combine a two dimensional translation sensor, such as a rollerball, with a rotatable circular member, such as a rotatable ring. An encoder measures rotation of the ring relative to the housing and provides a third dimensional input to a host computer. The third dimensional input may be used by a host computer together with a two-dimensional input from the two dimensional position sensor to allow the simultaneous three dimensional direct manipulation of graphical objects on a computer display. Preferably the two dimensional translation sensor is located in the center of the ring. Preferably the two dimensional translation sensor can be disabled by tilting the housing to lift the two dimensional translation sensor out of contact with a surface while maintaining the ring in contact with the surface to provide a 1-D control. This device permits smooth intuitive switching between 1-D, 2-D and 3-D control modes.

21 Claims, 6 Drawing Sheets

5,936,612

COMPUTER INPUT DEVICE AND METHOD FOR 3-D DIRECT MANIPULATION OF GRAPHIC OBJECTS

TECHNICAL FIELD OF THE INVENTION

This invention relates to computer input devices, and more particularly to computer input devices which can provide three-dimensional (3-D) direct manipulation of graphic objects for human-computer interaction. The invention may be embodied in a computer mouse.

BACKGROUND OF THE INVENTION

Modern human computer interfaces allow a user to directly "manipulate" graphic objects to control the operation of a host computer system. For example, motion of a cursor on a computer display may be guided by an input device operated by a user. The amount of motion of the input device in various directions is measured. The cursor is moved by corresponding amounts in corresponding directions. A user may use the cursor to select items from a menu or press graphical "buttons" displayed on the computer display. The effectiveness and efficiency of direct manipulation depends on providing computer input devices which allow a user to intuitively interact with the graphical objects displayed by the computer system.

Typical direct manipulation devices, including mice, trackballs, joysticks and light pens, provide a spatial compatibility between motor control of a human hand and the resulting movements of graphical objects displayed on a computer display. Mice, in particular, have become standard direct manipulation devices for today's computers. A limitation of conventional computer mice and most other prior art input devices is that they produce only two-dimensional input. For example, in current applications, a mouse is usually used as a pointing device or cursor locator by mapping hand translation movements on a flat surface (having two degrees of freedom) onto two dimensional ("2-D") translation movements of a cursor on a computer display.

There is a need to add a third dimension to direct manipulation devices for human-computer interaction. The third dimensional input "Z" can be combined with two-dimensional inputs "X" and "Y" to facilitate three dimensional ("3-D") direct manipulation, such as 3-D pointing in virtual reality, simultaneous control of object translation and rotation in computer-aided design/computer aided manufacturing ("CAD/CAM") drawings, or zooming while "walking" through a graphic scene. Providing a third dimensional input is also desirable because the third dimension can serve as an independent one-dimensional ("1-D") control over some aspect of a computer display. An independent 1-D direct manipulation of graphic objects can be very useful for tasks such as scrolling a document, zooming in one direction, or surfing between web pages.

It is typically difficult and tedious to use a standard 2-D mouse for 3-D direct manipulation tasks. For a simultaneous 3-D manipulation task, users usually have to first break the task into 1-D or 2-D components and then perform the task one component at a time. For example, in current drawing applications, in order to move a graphic object to a new position which requires the object to be both translated and rotated users must first translate the object to its desired location and then rotate the object about a fixed point. Similarly, when performing 1-D manipulations, such as dragging a scroll box along a scroll bar, with the current 2-D mouse, users have to guide the 2-D mouse carefully so that the cursor remains on the 1-D control.

The prior art includes two types of computer input devices which provide a third dimensional input. One such device is the "dual detector mouse", which consists of two spaced apart 2-D translation detectors, such as rollerballs. One of the detectors serves as a primary detector. The primary detector senses 2-D translation movements of the mouse over a surface and provides X and Y inputs to a host computer system. Inputs from the second detector can be combined with inputs from the primary detector and used to calculate an angle of rotation of the mouse relative to the surface. This angle of rotation can be used as a third dimensional or "Z" input. A dual detector mouse is described, for example, in U.S. Pat. No. 5,512,920.

One major disadvantage of the dual detector mouse is that it is difficult to provide independent 1-D manipulation of a graphic object. The "Z" input is not independent of translations in the other two dimensions. For example, while turning a graphic object around a fixed point, or zooming on a document, it is very hard for the user to rotate a dual detector mouse without translating it at the same time. In addition, the rotation center of the dual detector mouse has to be arbitrarily pre-determined, and the algorithms for calculating rotation angles are not straightforward to the user.

Another type of computer input devices which can produce a third dimensional input is the "thumb wheel mouse" which is described for example in U.S. Pat. No. 5,473,344. A thumb wheel mouse operates in substantially the same way as a conventional mouse but has a small wheel or roller projecting from a top surface of the mouse. The wheel can be turned by a user's thumb or other fingers to provide a third dimensional input. Unlike the dual detector mouse, the thumb wheel mouse allows an independent 1-D direct manipulation for tasks such as one-dimensional zooming and scrolling. However, it is difficult to use a thumb wheel mouse to achieve a simultaneous 3-D direct manipulation. For example, in order to move a graphic object to a location with a specific orientation in CAD/CAM drawings, the user may have to first translate the mouse to cause an object to move to the required location and then rotate the thumb wheel to turn the object to the desired orientation. This procedure is similar to using a current 2-D mouse for the same task and is cumbersome for the user. Further, with the thumb wheel mouse, users may need to exercise careful motor control to coordinate manipulation of the thumb wheel with a finger and movement of the mouse by hand.

Computer software applications may require switching among 1-D, 2-D and 3-D control modes from time to time. For example, in CAD/CAM drawing applications, a user may want to simultaneously translate and rotate a graphic object to match a target location and orientation (3-D manipulation), then zoom in to see details of the graphic object (1-D manipulation), and then make a final adjustment of the object's position by translating the object (2-D manipulation). When surfing on the Internet, a user may want to provide a 1-D input ("Z") for scrolling on web page, a 2-D input (X and Y) for locating a hot link on the displayed portion of a selected web page, and a 3-D input (X, Y and Z together) for simultaneously scrolling the page and locating the hot link. A smooth change of control modes is necessary so as not to interrupt the user's focus on the task.

There is an increasing need for a computer input device which can provide 1-D, 2-D and 3-D direct manipulation of graphic objects and can be switched easily between 1-D, 2-D and 3-D modes.

SUMMARY OF THE INVENTION

One aspect of the invention provides a computer input device. The input device comprises a hand holdable housing;

2-D position sensor in the housing for monitoring movements of the housing relative to a surface under the housing; a rotatable circular member on a lower surface of the housing, a circular member mounted on a lower surface of the housing for rotation about an axis, the circular member having a surface-contacting portion lying in a plane generally perpendicular to the axis, the circular member located so as to be rotatable about the axis by frictional contact between the surface-contacting portion and a surface under the housing when the housing is moved against the surface; an encoder in the housing for sensing an angle of the rotatable circular member relative to the housing; and, means for transferring 2-D position information from the 2-D position sensor and rotation information from the encoder to a host computer system. In a preferred embodiment the circular member is a ring and the 2-D position sensor is concentric with the ring.

Another aspect of the invention provides a computer system. The computer system comprises: a display displaying an image of a graphical object; an input device, for generating rotation information; means for transferring rotation information from the input device to a host computer; and, means for rotating the image in response to changes in the rotation information. The input device comprises: a hand holdable housing; a 2-D position sensor in the housing for monitoring movements of the housing relative to a surface under the housing; a rotatable circular member projecting downwardly from the housing, for rotation about an axis, the circular member having a surface-contacting portion lying in a plane generally perpendicular to the axis, the circular member located so as to be rotatable about the axis by frictional contact between the surface-contacting portion and a surface under the housing when the housing is moved against the surface; and, an encoder in the housing for obtaining rotation information by measuring rotary motion of the rotatable circular member relative to the housing.

Yet another aspect of the invention provides a computer system. The computer system comprises: a display displaying an image of graphical objects in a 3-dimensional virtual space and a cursor in the virtual space, the cursor having a cursor location in the virtual space, the cursor location defined by 3 cursor coordinates; an input device for generating 2-D position information and rotation information; means for transferring the 2-D position information and the rotation information to a host computer; and, means for moving the cursor location in the virtual space. The means for moving the cursor in the virtual space comprises means for changing values of first and second ones of the three cursor coordinates in response to changes in the 2-D position information and changing a value of a third one of the three cursor coordinates in response to changes in the rotation information. The input device comprises a hand holdable housing; a 2-D position sensor in the housing for generating 2-D position information by measuring movements of the housing relative to a surface under the housing; a circular member mounted on a lower surface of the housing for rotation about an axis, the circular member having a surface-contacting portion lying in a plane generally perpendicular to the axis, the circular member located so as to be rotatable about the axis by frictional contact between the surface-contacting portion and a surface under the housing when the housing is moved against the surface; and, an encoder in the housing for obtaining rotation information by measuring rotary motion of the rotatable circular member relative to the housing.

A further aspect of the invention provides a method for the direct manipulation of graphical objects displayed in a computer display. The method begins with the step of providing a computer input device comprising: a hand holdable housing; a 2-D position sensor in the housing for generating 2-D position information by measuring movement of the housing relative to a surface under the housing; a circular member mounted on a lower surface of the housing for rotation about an axis, the circular member having a surface-contacting portion lying in a plane generally perpendicular to the axis, the circular member located so as to be rotatable about the axis by frictional contact between the surface-contacting portion and a surface under the housing when the housing is moved against the surface; and, an encoder in the housing for generating rotation information by measuring rotation of the rotatable circular member relative to the housing about a generally vertical axis. The method comprises the further steps of: moving the housing relative to the surface so as to turn the rotatable circular member relative to the housing about the axis to generate rotation information; transferring the rotation information to a host computer system; and, rotating a graphical object on a display connected to the host computer system through an angle determined by the rotation information.

BRIEF DESCRIPTION OF THE DRAWINGS

In drawings which illustrate specific embodiments of the invention, but which should not be construed as restricting the spirit or scope of the invention in any way.

Figure 1:
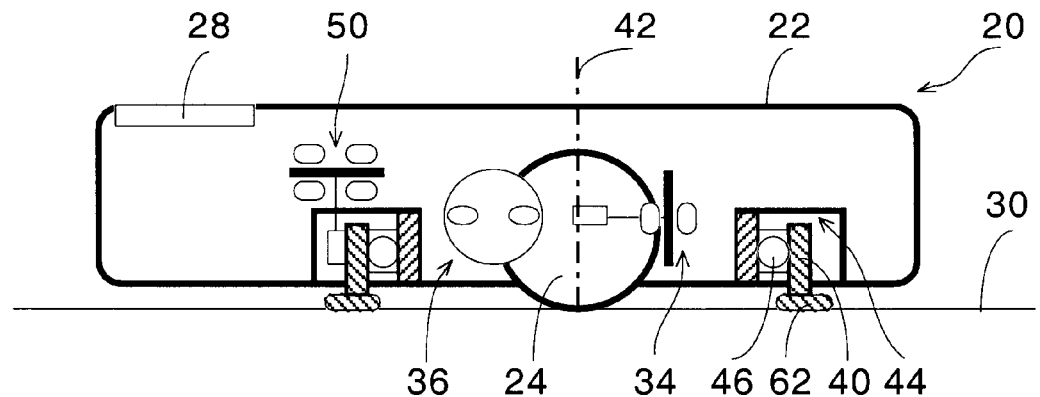
FIG. 1 is a schematic side view of the internal and external components of the computer input device of the present invention.

The following reference numerals are used in this specification:

20, 20A mouse;
22, 22A housing;
24 rollerball;
27 left button;
28 middle button;
29 right button;
30 surface;
34 encoder;
36 encoder;
38 host computer system;
40, 40A ring;

42 axis;
44 annular recess;
46 roller bearing;
50 ring rotation encoder;
52 roller;
54 encoder disk;
56 shaft;
58 light emitting diode;
60 photo detector;
62, 62A lower edge portion of ring;
70 keyboard;
72 display;
80 graphic object;
82, 83, 84, 85 vectors;
86 line;
88 target position;
90 drawing;
92 cursor;
93, 94 paths;
96 knob image;
98, 100 knob positions.

DETAILED DESCRIPTION

Figure 2:
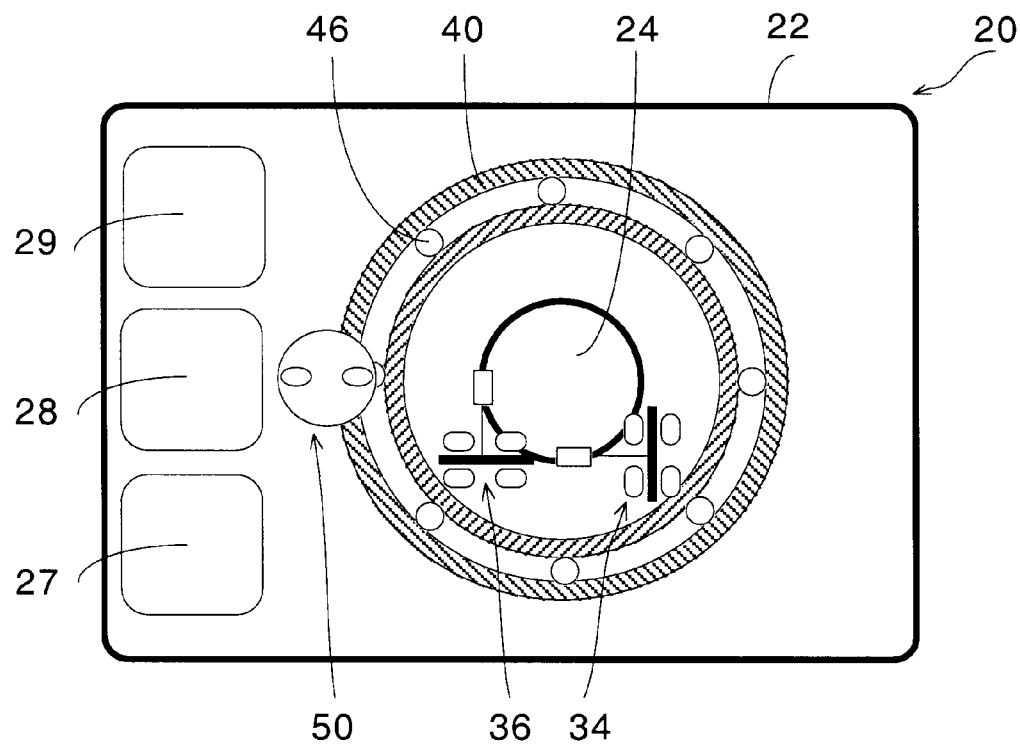
FIG. 2 is a schematic top view of the computer input device of FIG. 1.

FIGS. 1 and 2 show a computer input device according to this invention in the form of a mouse 20. Mouse 20 comprises a housing 22, and a 2-D (or "X-Y") position sensor, such as a rollerball 24, in housing 22. Mouse 20 can be held and moved by a user's hand. Rollerball 24 provides 2-dimensional inputs to a computer. A circular member (e.g. ring 40) provides a further 1-D input to a computer as described below. Together, the 2-D position sensor and ring 40 can provide 3-D inputs to a computer.

The 2-D position sensor may comprise a rollerball 24 as described herein or any other suitable 2-D position sensing device such as an optical sensor moving on a tablet. The term 2-D position sensor encompasses all such devices which can practically be used in the context of this invention.

Mouse 20 preferably also incorporates one or more additional switches which may be used to control the operation of mouse 20 and/or to generate events for processing by a computer. For example, mouse 20 may have a number of buttons for accepting user input. The mouse 20 shown in the drawings has a left button 27, a middle button 28 and a right button 29 on an upper surface of housing 22. Buttons 27, 28 and 29 are within reach of a user's fingers. Mouse 20 may have more than or fewer than 3 buttons.

As mouse 20 is moved over a surface 30, such as a desk top, a portion of rollerball 24 which projects from housing 22 rolls along surface 30. Information about the rotation of rollerball 24 on surface 30 relative to two perpendicular axes of rotation is collected by encoders 34 and 36. Encoder 34 detects X axis movement of rollerball 24, and encoder 36 detects Y axis movement of rollerball 24. Information from encoders 34 and 36 is transferred to a host computer system 38 (FIG. 4) where the information can be used, for example, to update the position(s) of a cursor and/or other graphical objects on a display attached to the host computer. Encoders 34 and 36 may be any suitable type of encoder. Those skilled in the art are aware of several types of encoder suitable for use in this invention. For example, some known types of encoder for use with a rollerball are described in U.S. Pat. No. 5,473,344. Mouse 20 may be connected to transfer information to a host computer by a cord or a wireless link of any suitable kind.

The rotatable circular member, shown in the drawings as a ring 40, projects from a bottom surface of housing 22. Ring 40 is mounted to housing 22 in a way which leaves it free to rotate about an axis 42. When mouse 20 is sitting flat on a flat surface 30, mouse 20 is oriented so that axis 42 is generally perpendicular to surface 30 and the plane defined by surface-contacting (or "lower edge") portion 62 of ring 40 is perpendicular to axis 42 and generally parallel to surface 30.

In the embodiment of FIG. 1, ring 40 is received in, and projects from, an annular recess 44 in housing 22. Ring 40 is mounted to housing 22 by a rotatable coupling such as a roller bearing 46, a bushing, or any other suitable rotatable coupling that permits smooth rotation of ring 40 about axis 42 relative to housing 22. The lower surface of mouse 20 is configured to allow mouse 20 to rest stably on surface 30 with axis 42 generally perpendicular to surface 30.

Figure 3:
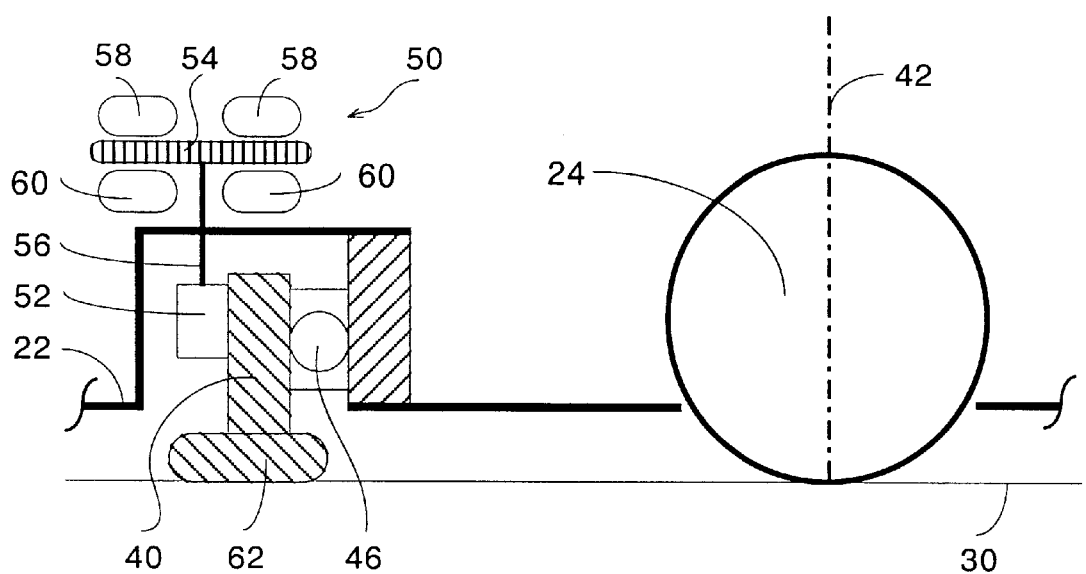
FIG. 3 is a schematic detail of the rotatable ring and its rotation encoder unit.

A ring rotation encoder 50 detects rotary motion of ring 40 relative to housing 22. Ring rotation encoder 50 produces rotation information which can be passed to a host computer. One possible construction of ring rotation encoder 50 is shown in FIG. 3. In the embodiment of FIG. 3, ring rotation encoder 50 comprises a roller 52 which engages ring 40. An apertured encoder disc 54 is attached by a shaft 56 to roller 52. When ring 40 rotates then encoder disc 54 also rotates. The rotation of encoder disc 54 periodically interrupts the transmission of light between pairs of light-emitting diodes ("LEDs") 58 and photo detectors 60 which lie on either side of encoder disc 54. Preferably ring rotation encoder 50 comprises two pairs of LED's 58 and photo detectors 60 so that both the direction and amount of rotation of ring 40 can be determined from the output of ring rotation encoder 50. It will be appreciated by those skilled in the art that the construction of ring rotation encoder 50 shown in FIG. 3 is substantially the same as the construction of encoders for the rotations of rollerballs in some known types of conventional computer mice. Further details of the construction of encoder 50 are not provided here because they are well known to those skilled at designing computer input devices. Any other practical type of encoder which produces ring rotation information capable of being transferred to a host computer system could readily be used in place of the optical ring encoder 50 described above to measure relative rotation between housing 22 and ring 40. In this application the term "encoder" encompasses all such practical encoders.

Ring 40 preferably comprises a lower edge portion 62 which projects far enough out of housing 22 that mouse 20 can be entirely supported by ring 40 when mouse 20 is sitting on a flat surface 30. Ring 40 is preferably large enough relative to housing 22 that it can stably support mouse 20 on flat surface 30. When mouse 20 is resting on a flat surface 30, the bottom surface of lower edge portion 62 of ring 40 and the bottom of rollerball 24 both rest on surface 30.

As shown in FIGS. 7A through 7D, lower edge portion 62 should project far enough out of housing 22 that rollerball 24 may be lifted clear of surface 30 by tilting one side of mouse 20 up about a point on lower edge portion 62. Rollerball 24 is preferably concentric with ring 40 so that its center is on axis 42 when mouse 20 is resting on surface 30.

Figure 8A:
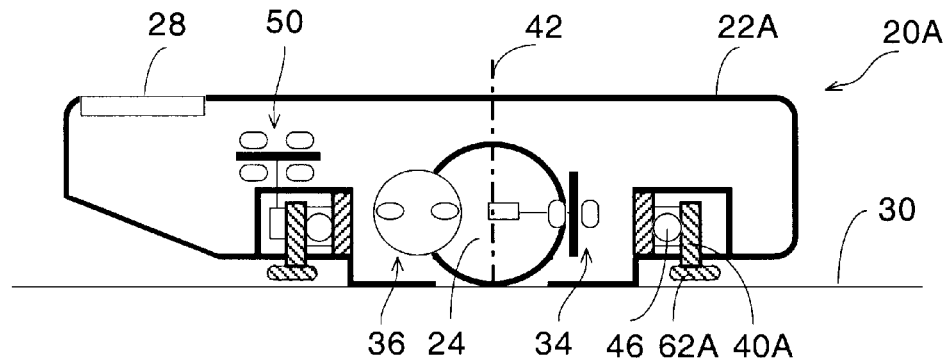
Figure 8B:
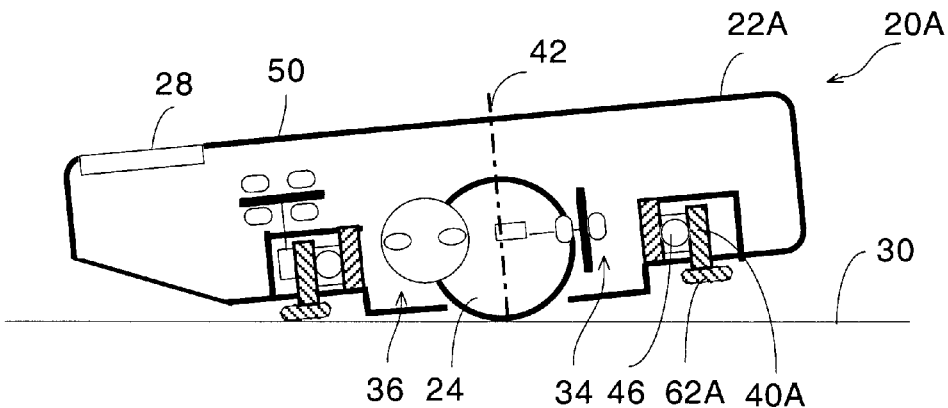
Figure 8C:
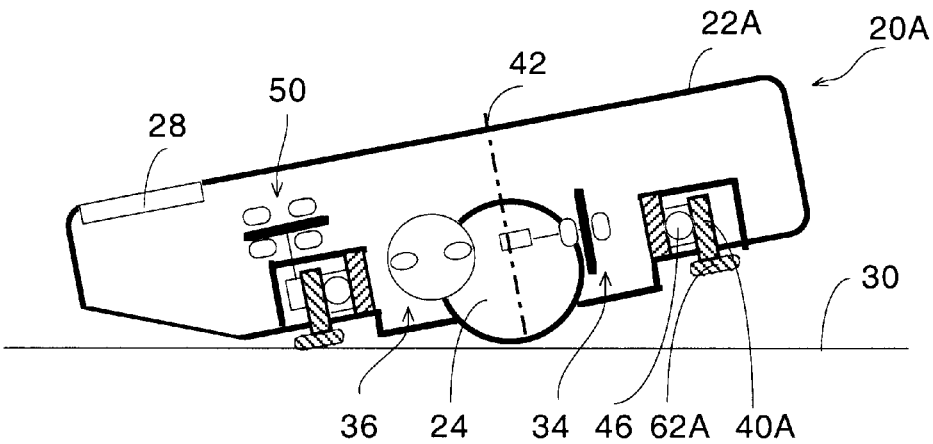

An alternative mouse 20A according to a second embodiment of the invention is shown in FIGS. 8A, 8B and 8C. Mouse 20A has a ring 40A which is not in contact with surface 30 when housing 22A is sitting flat on surface 30. Ring 40A has a surface contacting portion 62A which can be frictionally engaged with surface 30 by slightly tilting housing 22A until an edge of portion 62A contacts surface 30, as shown in FIG. 8B. Preferably, as shown in FIG. 8B, ring 40A can be brought into frictional contact with surface 30 by tilting housing 22A slightly enough that rollerball 24 is not lifted off from surface 30. By tilting mouse 20A further, rollerball 24 can be lifted clear of surface 30 while ring 40A remains in frictional contact with surface 30. The embodiment of FIGS. 8A, 8B, and 8C is preferred in applications which usually require only 2-D or 1-D direct manipulation of graphical objects and do not require much simultaneous 3-D direct manipulation of graphical objects, as described below.

The configuration of mouse 20 allows a user to selectively generate 2-D, 3-D or 1-D information for transmission to a host computer. Mouse 20 can be used as a conventional 2-D mouse by receiving and using at a host computer "X" and "Y" position information from encoders 34 and 36 about translations of mouse 20 on surface 30. When mouse 20 is used in such a 2-D mode then the output from encoder 50 is not used.

Mouse 20 may be used to provide simultaneous 3-D control by transferring rotation information from encoder 50 to applications on a host computer. In this "3-D mode", information generated by all of encoders 50, 34 and 36 are transferred substantially simultaneously to a host computer system 38. Computer system 38 may comprise a single computer or a network of computers and includes a suitable hardware/software interface to mouse 20.

In 3-D mode a user can change the "X" and "Y" position information produced by encoders 34 and 36 by translating mouse 20 on surface 30. The user can control the information generated by encoder 50 (or "rotation information") by moving mouse 20 so that ring 40 turns relative to housing 22. Various ways of moving mouse 20 to turn ring 40 relative to housing 22 are described below. A user can move mouse 20 so as to simultaneously turn ring 40 and change the "X" and "Y" position information produced by encoders 34 and 36.

Preferably switching means are provided to allow a user to switch between 2-D and 3-D modes. In 2-D mode the rotation information output by encoder 50 is not needed. In 2-D mode, rotation information may, for example, be ignored by interface or application software running in the host computer or, in the alternative, mouse 20 may include a switch to prevent encoder 50 from generating rotation information or to block transmission of rotation information to host computer system 38.

Most preferably a control for switching between 2-D and 3-D modes (i.e. enabling or disabling the transfer of ring rotation information) is provided on mouse 20. For example, mouse 20 and/or its interface to a host computer system may be constructed to toggle between 2-D and 3-D modes when a user clicks middle button 28 of mouse 20. Clicking middle button 28 may, for example, enable or disable the transfer of rotation information to application programs running on the host computer, either by controlling software in the host computer system or by changing the physical state of circuitry in mouse 20. In the alternative, 2-D to 3-D mode switching could be implemented in a way which switches modes in response to a user depressing a key or a combination of keys on a keyboard 70 attached to host computer system 38, issuing a voice command, or the like.

It will be noted that the alternative mouse 20A shown in FIG. 8A is in a 2-D mode by "default" because ring 40A does not contact surface 30 when mouse 20A is sitting flat on surface 30. A mouse 20A may be particularly useful in applications in which 2-D manipulation is required more often than 3-D manipulation. When 3-D manipulation is required then mouse 20A can be placed in its 3-D mode by tilting it into the position shown in FIG. 8B. 1-D control using mouse 20A can be achieved by tilting mouse 20A further into the position shown in FIG. 8C wherein rollerball 24 is lifted clear of surface 30. In the position of FIG. 8C, motion of mouse 20A relative to surface 30 does not affect rollerball 24. When mouse 20A is in the position of FIG. 8C, ring 40A remains in contact with surface 30.

By contrast, 3-D mode is more easily available in the mouse 20 of FIG. 1. When mouse 20 is sitting flat on surface 30 both rollerball 24 and ring 40 are in contact with surface 30. Therefore, by moving mouse 20 a user can simultaneously control "X" and "Y" position information and "Z" rotation information being transferred to a host computer system 38.

Mouse 20 may also be used to provide 1-D control information. In 1-D mode position information generated by rollerball 24 is either not generated, is blocked, or is ignored by hardware and/or software in host computer system 38 and/or mouse 20. Only rotation information from ring encoder 50 is used in host computer 38. Switching between 1-D and 2-D/3-D modes can be done by tilting mouse 20, as shown in FIGS. 7A through 7D. When mouse 20 is tilted as shown in FIGS. 7A through 7D, rollerball 24 no longer contacts surface 30. As long as mouse 20 is kept tilted, the outputs from encoders 34 and 36 do not change (because rollerball 24 does not move). In this "1-D control mode". Ring 40 can be caused to rotate by moving housing 22 along surface 30 with the edge of ring 40 rolling along surface 30. With mouse 20 tilted, a user can turn ring 40 relative to housing 22 without moving rollerball 24. The geometry of housing 22, ring 40 and 2-D sensor (e.g. rollerball 24) is preferably such that rollerball 24 is disengaged from surface 30 when housing 22 is tilted through a slight angle relative to surface 30.

In the alternative, a 1-D control may be accomplished by holding mouse 20 in place on surface 30 and turning mouse 20 about axis 42. In the further alternative, while it is not generally necessary, switching means could be provided, as described above, to fix mouse 20 in 1-D mode by disabling the transmission of position information from encoders 34 and 36 to applications on a host computer.

When mouse 20 is being operated in 1-D mode, mouse 20 provides a 1-D control (rotation of ring 40), which is independent of the X-Y position of mouse 20 on surface 30. Such a 1-D control is particularly desirable for tasks such as one-dimensional zooming, document scrolling and Internet surfing. In 1-D mode, mouse 20 can be lifted off of surface 30 and moved to a new starting location without altering the angle of rotation of ring 40 relative to housing 22. This technique, which is known as "stroking" allows a user to achieve arbitrarily large amounts of rotation of ring 40 while keeping his or her hand and arm within a range of comfortable postures. The fact that mouse 20 can be tilted in any direction as shown in FIGS. 7A, 7B, 7C and 7D makes it possible for a user of mouse 20 to provide independent 1-D control information to a host computer system with easy hand movements.

Other mode changes may also be made to affect the way that inputs from mouse 20 are used by a host computer system while a user is doing certain tasks. For example, when mouse 20 is in its 1-D mode, a double-click on the mouse middle button 28 may be used by software on a host computer to switch between a mode in which ring rotation information from ring encoder 50 is used to control zooming of an image on display 72 and a mode in which the ring rotation information is used to control scrolling through a document.

Figure 4:
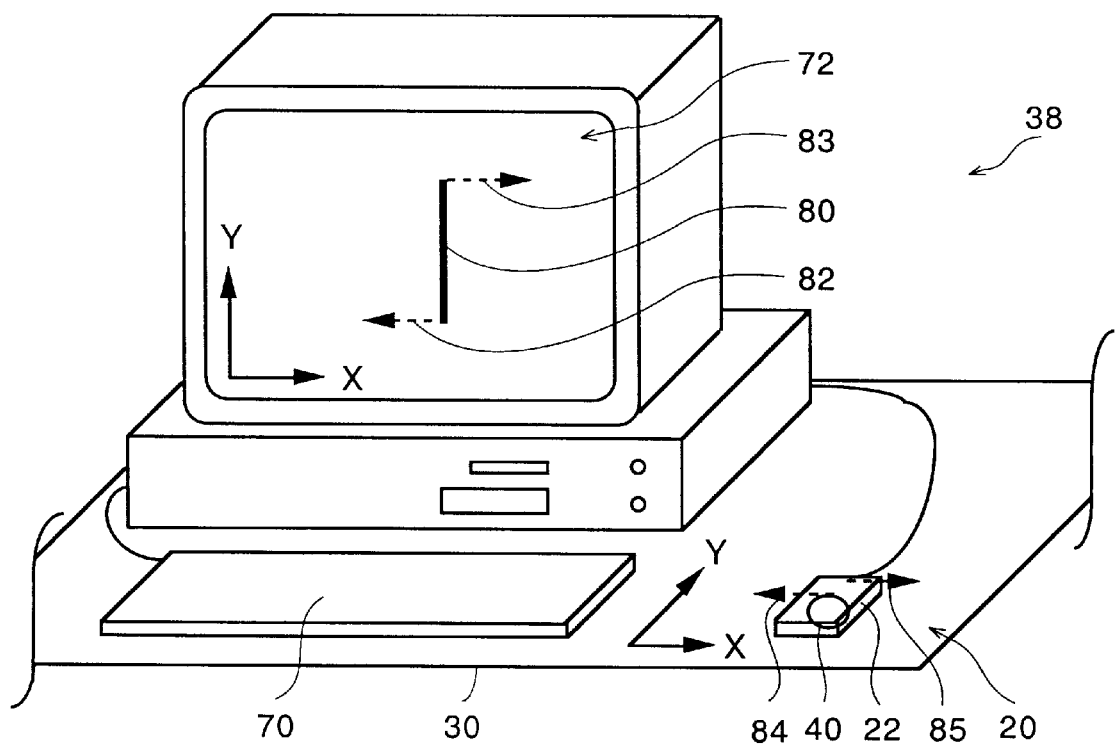
FIG. 4 is a diagrammatic illustration of the computer input device of the invention being used to control the rotation of a graphic object on a computer display.

Using suitable software techniques as are well known to those skilled in the art, the information transferred from mouse 20 to a host computer system may be used to provide interaction with a graphical user interface or for controlling the operation of application software on the host computer system. For example, the X and Y axis movements of mouse 20 on surface 30, as detected by encoders 34 and 36 may be directly mapped onto X and Y axis movements of a graphic object 80 on a computer display 72 (FIG. 4). "Z" axis information generated by the rotation of ring 40 may be mapped to the rotation of object 80 on display 72 or mapped to motions of a graphical object in a "Z" direction in a 3-dimensional virtual space.

The preferred relationship of rotation direction between an object 80 on computer display 72 and mouse 20 on a flat surface 30 is shown in FIG. 4. A clockwise rotation of housing 22 relative to ring 40 preferably causes a clockwise rotation of graphic object 80 on computer display 72. In other words, graphic object 80 should rotate as if it were a physical object subjected to the torque that would result from forces directed along vectors 82 and 83 when mouse 20 is twisted by the torque resulting from forces directed along corresponding vector 84 acting on ring 40 and vector 85 acting on housing 22.

Figure 5:
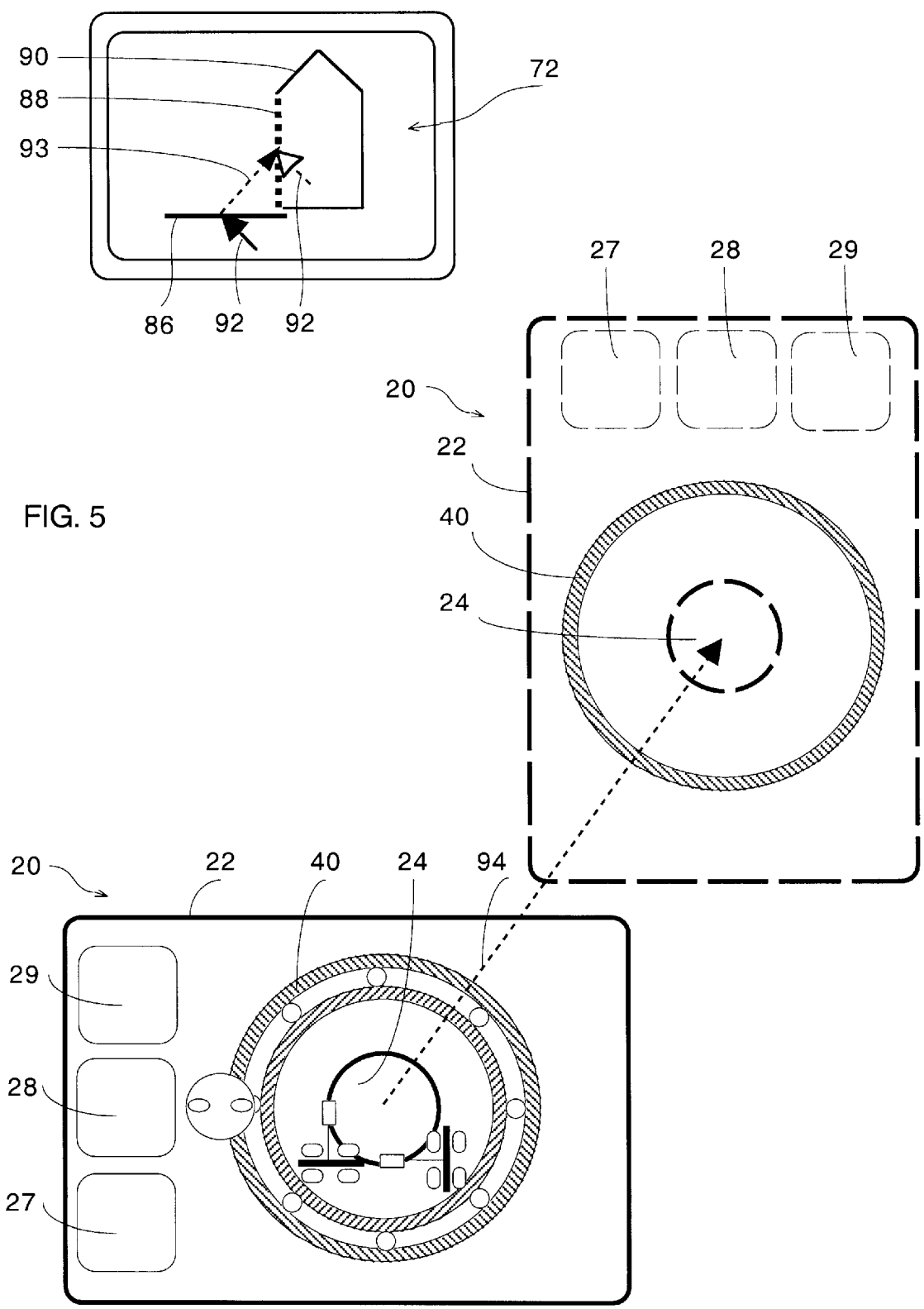
FIG. 5 is a diagrammatic illustration of a simultaneous 3-D control of object translation and rotation with the computer input device of the present invention.

FIG. 5 illustrates the application of a mouse 20 according to the invention, supported by suitable software, to the task of fitting a graphic object, which is shown as a line 86, into a target position 88 to complete a drawing 90 on computer display 72. A user can select line 86 by, for example, positioning a cursor 92 on line 86 and pressing left button 27 of mouse 20. Line 86 can then be moved to its target position 88 along a path 93 by simultaneously translating and rotating mouse 20 along path 94 on surface 30. Most preferably line 86 rotates about cursor 92.

This illustrates how mouse 20 can be used in its 3-D mode to complete a 3-D manipulation task including both translation and rotation of a graphic object with a single intuitive movement of the hand. The translation of mouse 20 along path 94 on surface 30 as measured by rollerball 24 and encoders 34 and 36 is directly mapped to the translation of line 86 along path 93 on computer display 72. At the same time, the amount of relative rotary motion between housing 22 and ring 40 is picked up by encoder 50 and transferred to host computer system as rotation information which can be used to control rotation of line 86.

A user can control the amount of rotation of ring 40 by either preferentially applying pressure to mouse 20 on one side or the other of path 94 as mouse 20 is translated along path 94 or by twisting housing 22 relative to surface 30 or both. Since ring encoder 50 senses the relative rotary motion between housing 22 and ring 40, users can either rotate housing 22 or rotate ring 40 to cause the same relative rotary motion to be measured by encoder 50.

With suitable software, a computer can be caused to show a graphical object on display 72 rotating through an angle determined by the output of encoder 50. Typically the object of display 72 will be made to rotate about a "Z" axis through an angle equal to the relative rotation between ring 40 and housing 22. For example, if encoder 50 is of a type which counts pulses, with one pulse produced each time ring 40 turns through a small increment of angle, then the rotation of a graphic object may be matched to the rotation of ring 40 about a given angle by rotating the graphic object through an angle given by:

$$\theta = \frac{360° \times (N_{end} - N_{start})}{N_{total}} \quad (1)$$

where θ is the angle of rotation of the graphic object; $N_{total}$ is the total number of steps of rotary movement generated in a full revolution of ring 40; and $N_{end}-N_{start}$ is the number of steps of rotary movement counted by encoder 50 during the rotation in question.

When housing 22 is rotated in an opposite direction to ring 40 an apparent rotation acceleration occurs, as the object rotation on display 72 is faster than the rotation of housing 22 relative to surface 30. Such a rotation acceleration may be deliberately achieved by a user of mouse 20 by turning mouse 20 and simultaneously applying an uneven pressure to housing 22 while translating mouse 20. The uneven pressure on housing 22 produces uneven frictional forces along lower portion 62 of ring 40. These uneven frictional forces cause ring 40 to turn in an amount additional to any turning of housing 22 relative to surface 30. For example, referring to FIG. 5, if a user applies slightly more pressure on the left side of housing 22 with respect to path 94 while translating mouse 20 along path 94, line 86 may be moved to its target position 88 with less rotation of housing 22 relative to surface 30 than would otherwise be required.

On the other hand, if the user applies slightly more pressure on the right side of housing 22 (relative to path 94) while translating mouse 20 along path 94, then the user will need to rotate housing 22 through a larger angle relative to surface 30 to cause line 86 to be rotated into target position 88 on display 72. In general, rotating housing 22 and ring 40 in the same direction results in an apparent rotation deceleration. This effect may be exploited by a user to slow down the rate at which line 86 rotates as line 86 approaches target position 88 so that line 86 may be oriented accurately.

Mouse 20 could be used in 3-D mode to navigate a cursor through a 3-D virtual space. In this application, X and Y coordinates in the 3-D virtual space are changed by inputs from the X-Y position sensor (e.g. rollerball 24) and the Z coordinate in the 3-D virtual space is changed in response to rotation information from encoder 50.

Figure 6:
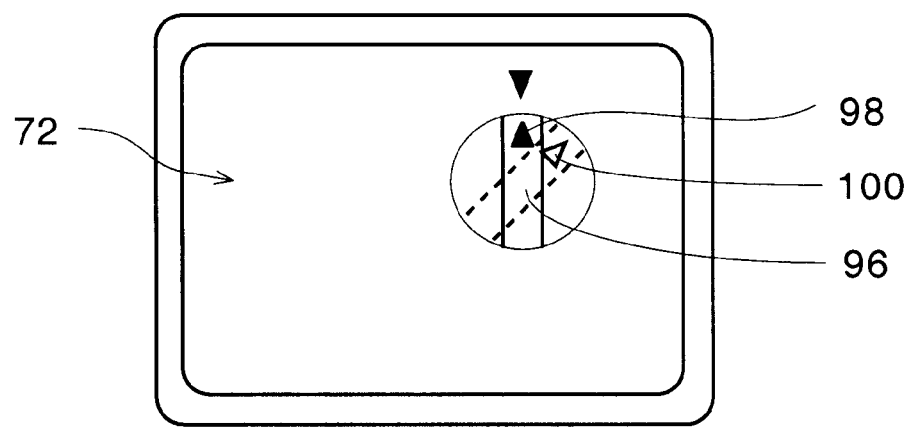
FIG. 6 is a diagrammatic illustration of the rotation control of a rotatable knob with the computer input device of the present invention.
Figure 6:
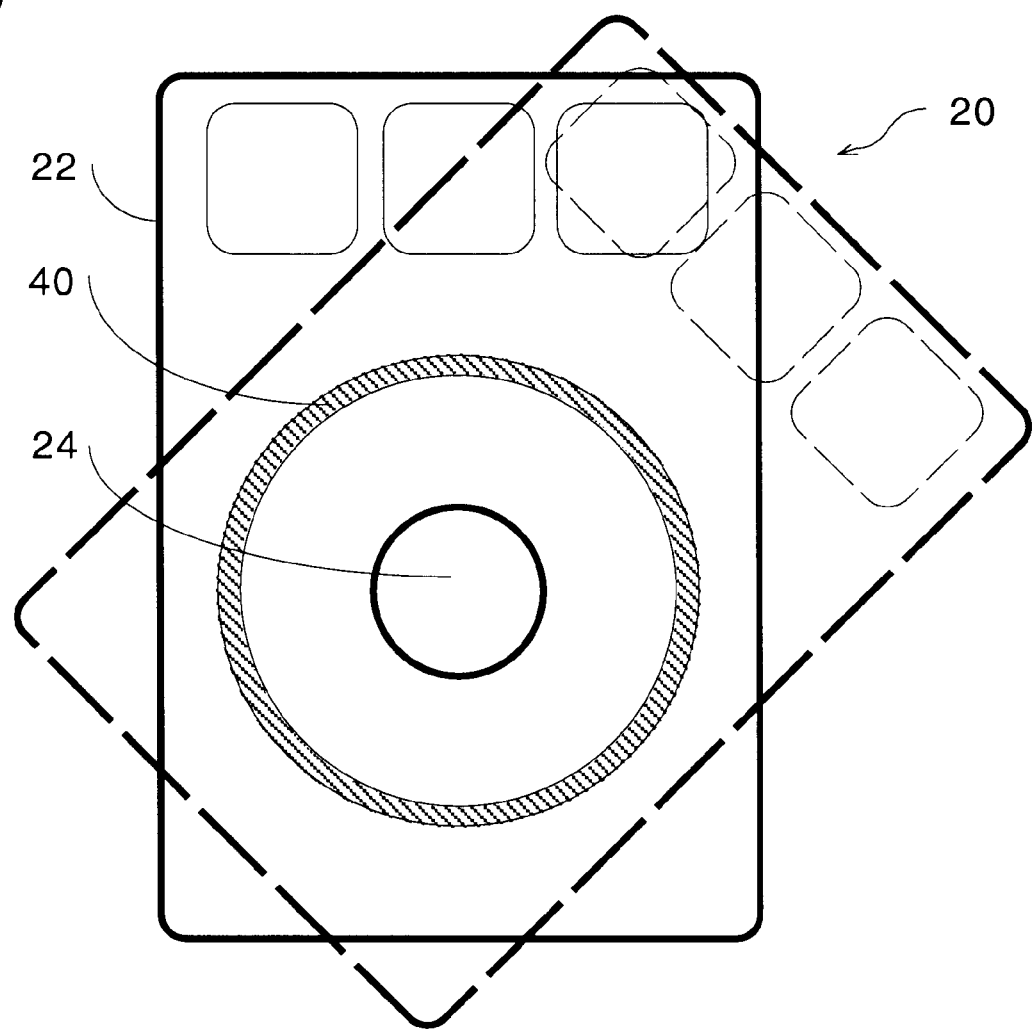
Figure 7A:
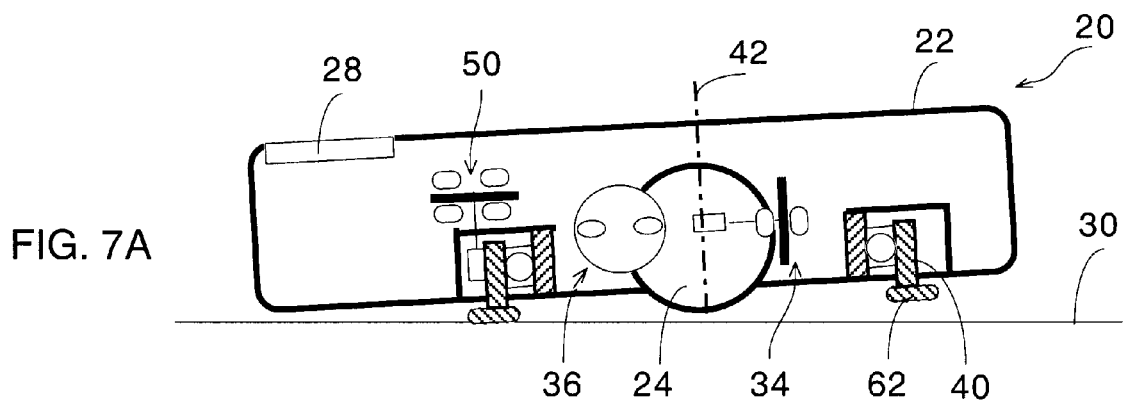
FIGS. 7A, 7B, 7C and 7D are diagrammatic illustrations of several operations for providing independent 1-D control with the computer input device of the present invention; and, FIGS. 8A, 8B and 8C are sections through a mouse according to an alternative embodiment of the invention in which the mouse must be tilted to bring a rotatable ring into contact with a surface.
Figure 7B:
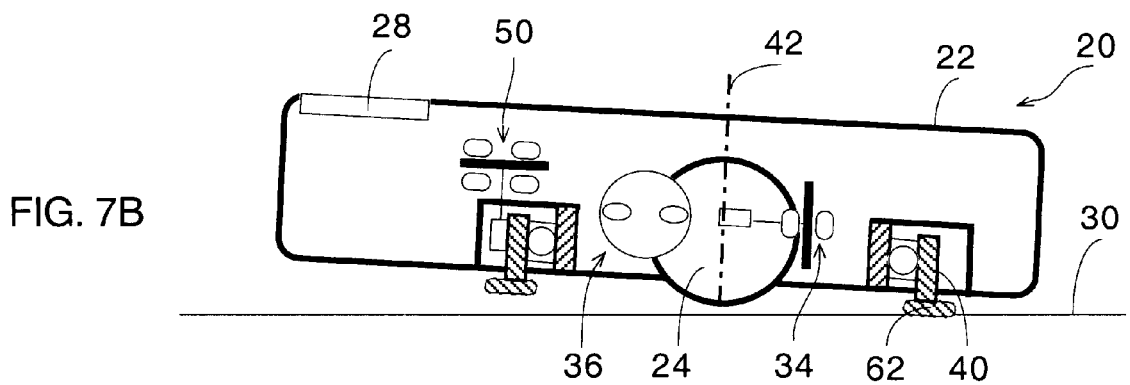
Figure 7C:
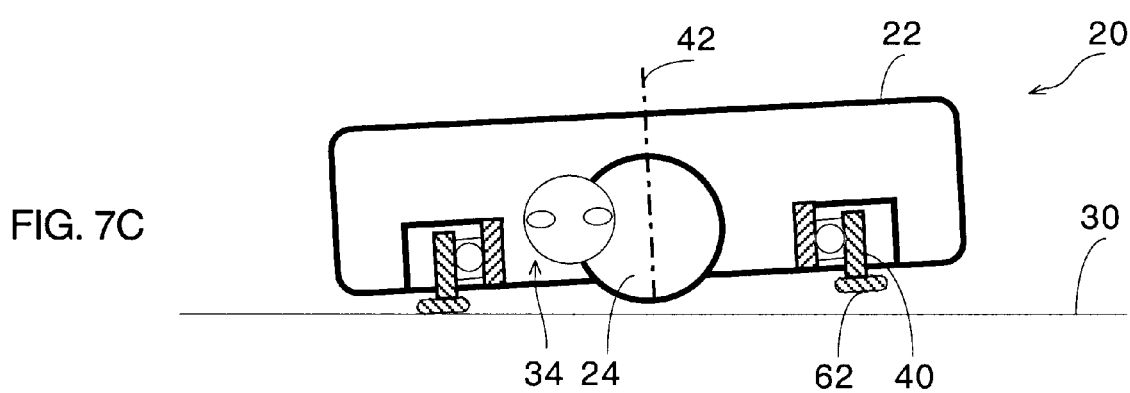
Figure 7D:
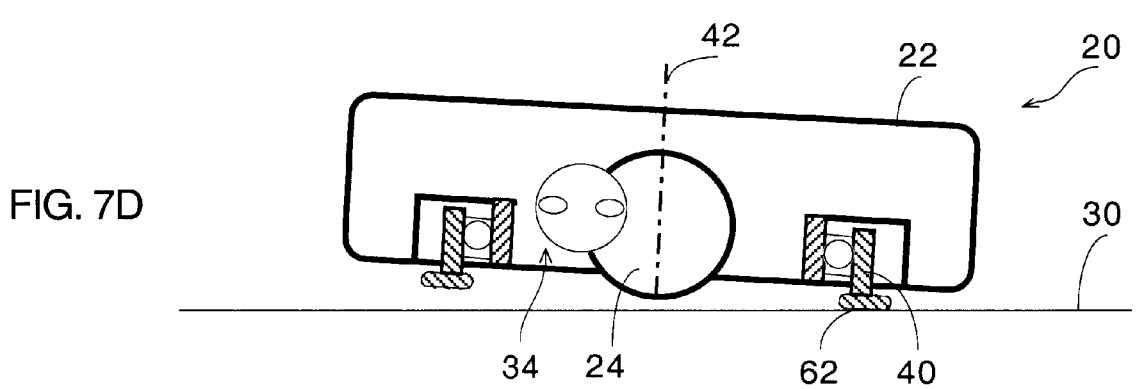

Mouse 20 makes it possible for a user to interact with a class of rotatable graphic objects for use as control widgets in addition to the conventional control widgets, such as a scroll bars, check boxes and radio buttons which are in current use. For example, as shown in FIG. 6, a control widget could comprise a rotatable image of a knob 96 on display 72. A user could, for example, control the volume of a speaker connected to the host computer by rotating knob image 96. The rotation of knob image 96 can be directly controlled by the rotation of mouse 20 on surface 30. For example, as mouse 20 is rotated clockwise about axis 42 from an initial position 98 (indicated with solid lines) to a final position (indicated in dashed outline), knob image 96 is rotated clockwise from an initial position 98 (indicated in solid lines) to a final position 100 (indicated in dashed outline).

A mouse 20 according to the invention may be used effectively in 1-D mode for tasks such as zooming. For example, with mouse 20 in 1-D mode a user could pull mouse 20 closer to zoom in on a portion of a document or push mouse 20 away to zoom out on the document. This manipulation is more intuitive and natural than using a thumb wheel to do zooming because "pulling in and pushing out" are spatially compatible to "zooming in and zooming out". Mouse 20 may also be used in 1-D mode to scroll through word processing documents without the need to point a cursor at a scroll bar. For example, software may be provided to scroll through a document whenever mouse 20 is tilted and moved by the hand to rotate ring 40.

The output of ring encoder 50 may be used in different ways by different types of application software. For example, an Internet browser may be configured so that one forth of a turn of ring 40 causes the browser to select a different web page. The rotation control provided by ring 40 can also be combined with the mouse buttons 27, 28 and 29, or keyboard 70 to perform a large range of functions as will be readily apparent to those skilled in the art. The particular hardware and software for interfacing mouse 20 with a host computer system, and the particular software for receiving an output from ring encoder 50 at a host computer and using that output to, for example, manipulate graphic objects, is not described in detail herein because such computer interfaces and software are both well understood by those skilled in the art and have many variations.

Mouse 20 may be used with a wide variety of applications for human-computer interaction. For example, CAD/CAM drawing applications could use the X, Y and Z information from mouse 20 to simultaneously translate and rotate a graphic object. In a 3-D graphic space, as is found in virtual reality applications, mouse 20 may be used as a 3-D pointer, with mouse translation movements as X, Y inputs and rotation movements as Z inputs. The outputs from mouse 20 could also be used to zoom in a specified direction in a 3-D space.

Manipulating images of complex graphical objects on a computer display with currently available computer input devices such as 2-D mice can be difficult. In addition to apparent translations in 3 directions, the object can be rotated about any of 3 axes. Thus, in general, to adjust the position of a 3-dimensional graphical object in a 3-dimensional virtual space requires manipulation of the object in 6 degrees of freedom.

A mouse 20 can provide an intuitive interface for positioning a 3-D object in a 3-D virtual space. A user first selects an axis, for example an X, Y or Z axis of the object. The user can then use mouse 20, as described above, to rotate the graphical object about that axis (by moving mouse 20 on surface 30 so as to rotate ring 40 relative to housing 22) or to translate the object in a 2-dimensional plane perpendicular to the selected axis. Rotations and translations can then be carried out relative to other axes. Selecting an axis could be carried out, for example, by clicking one of the buttons on mouse 20, by clicking a button on mouse 20 while a cursor on the display of the host computer system is positioned over a control icon, by pressing a key on a keyboard 70 connected to host computer system 38 or in other manners apparent to those skilled in the art.

An input device according to this invention, such as mouse 20, can provide a number of advantages over conventional 2-D pointing devices. Ring 40 and ring encoder 50 provide ring rotation information which can be used by a host computer as a third dimensional or "Z" input. The input device provides X and Y translation and Z rotation signals which can be used for 3-D direct manipulation of graphic objects. These signals are generated by mouse 20 in response to a user's hand movements on a flat surface. A user can achieve a simultaneous 3-D control of graphic objects on a computer display by moving mouse 20 over a flat surface 30 to simultaneously translate mouse 20 and cause ring 40 to rotate. The rotation of ring 40 may be caused by either or both turning housing 22 of mouse 20 relative to surface 30 and applying pressure to one side or the other of mouse 20 as mouse 20 is translated. Furthermore, the present invention allows the users to accelerate or stabilize the rotation process. A user can switch intuitively and simply between modes in which mouse 20 generates and transfers to a host computer system 1-D, 2-D or 3-D information.

The specific embodiments of the present invention have been described for purpose of illustration only. Those skilled in the art will understand that various modification may be made in light of the above description without departing from the scope of this invention. For example, the spatial layout of the components of mouse 20 including rollerball 24, encoders 50, 34 and 36, buttons 27, 28 and 29, electrical control circuits within housing 22 and the configuration of housing 22 and ring 40 may all be modified within the scope and spirit of the present invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A computer input device comprising:
   a) a hand holdable housing;
   b) a 2-D position sensor on the housing for monitoring movements of the housing relative to a surface under the housing;
   c) a rotatable ring mounted to the housing for rotation about an axis, the rotatable ring having an exposed surface-contacting portion on a lower side of the housing, the surface-contacting portion lying in a plane generally perpendicular to the axis, the rotatable ring located so as to be rotatable about the axis by frictional contact between the surface-contacting portion and a surface under the housing when the housing is moved against the surface;
   d) an encoder in the housing for sensing rotary motion about the axis of the rotatable ring relative to the housing; and,
   e) means for transferring 2-D position information from the 2-D position sensor and rotation information from the encoder to a host computer system.

2. The computer input device of claim 1 wherein the 2-D position sensor comprises a rollerball.

3. The computer input device of claim 2 wherein the rollerball is concentric with the rotatable ring.

4. The computer input device of claim 3 wherein the rollerball and the rotatable ring are located on the housing in positions such that, when the housing is on the surface and tilted through an angle relative to the surface, the rotatable ring remains in contact with the surface and the rollerball is not in contact with the surface.

5. The computer input device of claim 2 wherein the rotatable ring projects downwardly from an annular recess extending around the rollerball in the housing.

6. The computer input device of claim 1 wherein the 2-D position sensor monitors movement of a point concentric with the rotatable ring over a surface under the housing.

7. The computer input device of claim 1 wherein the 2-D position sensor and the rotatable ring are located on the housing in positions such that, when the housing is tilted through an angle relative to the surface, the rotatable ring remains in contact with the surface and the 2-D position sensor is moved away from the surface to a position wherein 2-D position information produced by the 2-D position sensor does not change as the housing is moved relative to the surface.

8. The computer input device of claim 1 comprising mode-switching means for selectively preventing the rotation information transferred to the host computer system.

9. The computer input device of claim 1 wherein the rotatable ring projects laterally from the housing, when the housing is sitting upright on a flat surface, the rotatable ring is generally parallel to and not in contact with the surface and the rotatable ring can be brought into frictional engagement with the surface by tilting the housing relative to the surface.

10. The computer input device of claim 9 wherein the 2-D position sensor and the rotatable ring are located on the housing in positions such that, when the housing is tilted through a first angle relative to the surface, both the rotatable ring and the 2-D position sensor engage the surface and, when the housing is tilted through a second angle, larger than the first angle, relative to the surface, the rotatable ring engages the surface but the 2-D position sensor no longer engages the surface.

11. A computer system comprising:
   a) a display displaying an image of a graphical object;
   b) an input device, the input device comprising
      i) a hand holdable housing;
      ii) a 2-D position sensor in the housing for monitoring movements of the housing relative to a surface beneath a lower surface of the housing;
      iii) a circular member rotatably mounted to the housing and projecting from the lower surface of the housing, the circular member rotatable about an axis, the circular member having a surface-contacting portion comprising a circular rim lying in a plane generally perpendicular to the axis, the circular member located so as to be rotatable about the axis by frictional contact between the surface-contacting portion and a surface under the housing when the housing is moved against the surface with the plane of the surface-contacting portion inclined with respect to the surface; and,
      iv) an encoder in the housing for obtaining rotation information by measuring rotary motion of the rotatable circular member relative to the housing;
   c) means for transferring rotation information from the encoder to a host computer; and,
   d) means for controlling the image in response to changes in the rotation information.

12. The computer system of claim 11 comprising means for transferring 2-D position information from the 2-D position sensor to the host computer and means for translating the image of the graphical object on the display in response to changes in the 2-D position information.

13. The computer system of claim 12 comprising mode-switching means for selectively preventing transfer of the rotation information to the host computer.

14. The computer system of claim 13 wherein the mode-switching means comprises a switch on the computer input device operable by a finger of a person grasping the computer input device.

15. The computer system of claim 12 wherein the graphical object comprises a multi-dimensional graphical object in a three dimensional virtual space and the computer system comprises axis selection means for selecting an axis in the virtual space wherein, upon selection of the axis, the computer system translates the graphical object in response to changes in the 2-D position information and rotates the graphical object in response to changes in the rotation information in a plane in the virtual space perpendicular to the selected axis.

16. The computer system of claim 15 wherein the axis selection means comprises means for selecting one of three mutually perpendicular axes in the virtual space.

17. The computer system of claim 12 comprising a cursor for selecting one of a plurality of graphic objects on the display and means for manipulating the graphic objects wherein, prior to and after selecting one graphic object, a position of the cursor on the display is determined by the 2-D position information and, after selecting the one graphic object, the graphic object is rotated about the cursor in response to the rotation information and the graphic object is translated with the cursor in response to the 2-D position information.

18. A computer system comprising:
   a) a display displaying an image of graphical objects in a 3-dimensional virtual space and a cursor in the virtual space, the cursor having a cursor location in the virtual space, the cursor location defined by 3 cursor coordinates;
   b) an input device, the input device comprising
      i) a hand holdable housing;
      ii) a 2-D position sensor in the housing for generating 2-D position information by measuring movements of the housing relative to a surface under the housing;
      iii) a member rotatably mounted to the housing for rotation about an axis, the member having a surface-contacting portion comprising a circular rim lying on an underside of the housing in a plane generally perpendicular to the axis, the circular rim located so as to be rotatable about the axis by frictional contact between the circular rim and the surface under the housing when the housing is moved against the surface with the axis generally perpendicular to the surface; and,
      iv) an encoder in the housing for obtaining rotation information by measuring rotary motion of the rotatable circular member relative to the housing;
   c) means for transferring the 2-D position information and the rotation information to a host computer; and,
   d) means for moving the cursor location in the virtual space comprising means for changing values of first and second ones of the three cursor coordinates in response to changes in the 2-D position information and changing a value of a third one of the three cursor coordinates in response to changes in the rotation information.

19. A method for the direct manipulation of graphical objects displayed in a computer display, the method comprising the steps of:
   a) providing a computer input device, the input device comprising:
      i) a hand holdable housing;
      ii) a 2-D position sensor in the housing for generating 2-D position information by measuring movement of the housing relative to a surface under the housing;
      iii) a rotatable circular member on a lower surface of the housing, the circular member located so as to be rotatable by frictional contact with the surface about an axis which is not parallel with the surface when the housing is moved against the surface; and,
      iv) an encoder in the housing for generating rotation information by measuring rotation of the rotatable circular member relative to the housing about the axis;

b) moving the housing relative to the surface so as to turn the rotatable circular member relative to the housing about the axis to generate rotation information;

c) transferring the rotation information to a host computer system; and, d) moving a graphical object on a display connected to the host computer system in response to the rotation information.

20. A computer input device comprising:

a) a hand holdable housing having a lower surface, the housing configured to sit upright on a surface under the housing;

b) a member rotatably mounted to the housing for rotation about an axis of rotation, the rotatable member having a surface-contacting portion exposed on the lower surface of the housing, the surface-contacting portion lying in a plane generally perpendicular to the axis, the surface contacting portion oriented in the housing such that, when the housing is sitting upright on a surface, the plane of the surface-contacting portion is parallel to the surface, the rotatable member located so as to be rotatable about the axis by frictional contact between the surface-contacting portion and a surface under the housing;

c) an encoder in the housing for sensing rotary motion about the axis of the rotatable member relative to the housing; and, d) means for transferring rotation information from the encoder to a host computer system.

21. The computer input device of claim 20 wherein the member comprises a circular rim and, when the housing is sitting upright on a flat surface, the circular rim is spaced apart from the surface wherein the circular rim can be brought into frictional engagement with the surface by tilting the housing relative to the surface.

* * * * *